Figure 1:
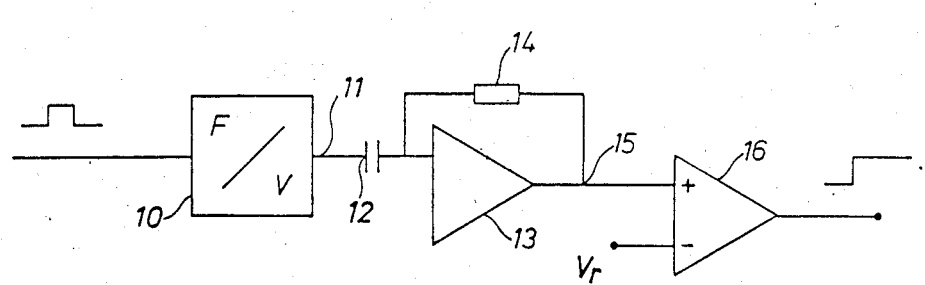

United States Patent [19]

Andreasson et al.

[11] Patent Number: 4,656,985
[45] Date of Patent: Apr. 14, 1987

[54] ARRANGEMENT IN A MOTOR SAW

[75] Inventors: Bo C. Andreasson, Göteborg; Jan O. Donnerdal, Partille; Hans I. Ström, Kode, all of Sweden

[73] Assignee: Aktiebolaget Electrolux, Sweden

[21] Appl. No.: 745,219

[22] Filed: Jun. 17, 1985

[30] Foreign Application Priority Data

Jun. 19, 1984 [SE] Sweden ................................ 8403280

[51] Int. Cl.⁴ ........................... F02P 9/00; B06T 7/12; B27B 17/02
[52] U.S. Cl. ..................................... 123/335; 30/382; 123/419; 188/137
[58] Field of Search ............... 123/335, 418, 436, 602, 123/419; 30/381, 382, 383; 188/77 R, 135, 137

[56] References Cited

U.S. PATENT DOCUMENTS

| 4,368,707 | 1/1983 | Leshner et al. | 123/436 |
| 4,402,138 | 9/1983 | Glockle et al. | 30/382 |
| 4,461,257 | 7/1984 | Hosaka et al. | 123/436 X |
| 4,553,517 | 11/1985 | Andreasson | 123/335 X |
| 4,573,556 | 3/1986 | Andreasson | 188/137 |

Primary Examiner—Tony M. Argenbright
Attorney, Agent, or Firm—Alfred E. Miller

[57] ABSTRACT

Upon a kick-back of a motor saw, energy is transferred from the rotating parts of the engine into energy which generates the kick-back. This causes a tremendous decrease of the r.p.m. of the engine. In the saw there is an electronic control comprising a timer which measures the r.p.m. of the engine. During certain intervals the difference in r.p.m. is computed with respect to previous intervals and if the r.p.m. has decreased more than a predetermined value, a sensor in the electronic control emits a signal which releases an electrically controlled chain brake for stopping the chain.

9 Claims, 3 Drawing Figures

ARRANGEMENT IN A MOTOR SAW

The present invention relates to an arrangement for release of a chain brake in a power chain saw which during operation with, for instance, debranching has a tendency to generate a kick-back by which the saw is thrown against the operator.

It is known to provide a chain brake in motor saws with an accompanying triggering mechanism so that the saw chain is stopped at an early stage of such a kick-back. In mechanical triggering devices parts are occasionally subjected to pollution, chips etc. which can make the device out of order. Apparently, it is therefore desireable to introduce a completely electrical triggering device without movable parts.

In the present invention a property of motor saws is used, namely the fact that the energy of the generation of a kick-back is taken from the rotating parts of the engine (flywheel, crankshaft and clutch). Since the kick-back takes energy from these parts, the r.p.m. of the engine is tremendously decreased. During duty the r.p.m. also can decrease but in such cases the decrease occurs during an essentially longer interval than the time of a kick-back. In accordance with the invention, a sudden decrease of r.p.m. can thus be used as an inication of a kick-back and the decrease occurs at once by the generation, which means that this indication is the most rapid of all. The pratical use of the indication takes place in an electronic r.p.m. meter which in coooperation with an associated logical unit supplies a signal for the release of an electrically operated chain brake.

An embodiment of a releasing device according to the invention will be described in the following with reference to the accompanying drawings which show in FIG. 1 a principle diagram of the releasing device, FIG. 2 a couple of diagrams for explaining the operation of the device according to FIG. 1, FIG. 3 an ignition system with a micro-processor and an operating circuit for a chain brake.

Figure 2:
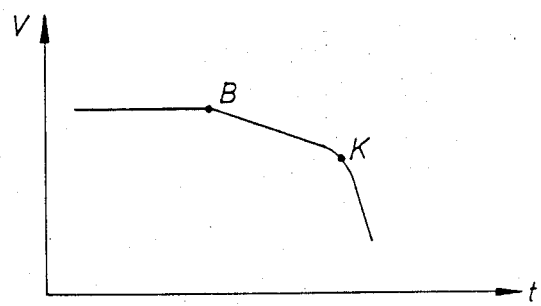
Figure 2:
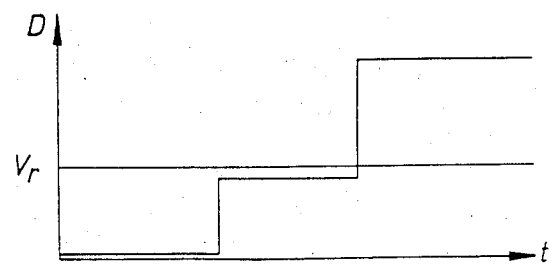

FIG. 1 shows in the form of a diagram how the electrical wiring of the device, in principle, can be made. Electric pulses from the electric system of the motor saw (the ignition system or the like) are fed to a frequency-voltage converter 10 supplying on its output 11 a voltage V which is analogous to the frequency of the pulses. Since the pulse frequency is proportional or equal to the r.p.m., the voltage obtained immediately follows the variations of the r.p.m. The output 11 is via a capacitor 12 connected to an opertion amplifier 13 connected as a derivative circuit and shunted by a resistor 14. The output 15 of the circuit is then a voltage which is an inverted derivative D of the voltage V. In FIG. 2 it is shown that D is O when V is constant, and upon a minor decrease of r.p.m. at B (at decreasing V) D has a moderate positive value. Such a decrease occurs when the saw is subjected to a normal loading. A greater and more rapid decrease occurs at K as a consequence of a kick-back. The derivative is then suddenly changed into a greater value. The derivative voltage is fed to a comparator 16 which also receives a reference voltage Vr. When this voltage is exceeded by the derivative voltage the comparator emits an output signal indicating that a kick-back is occurring.

Figure 3:
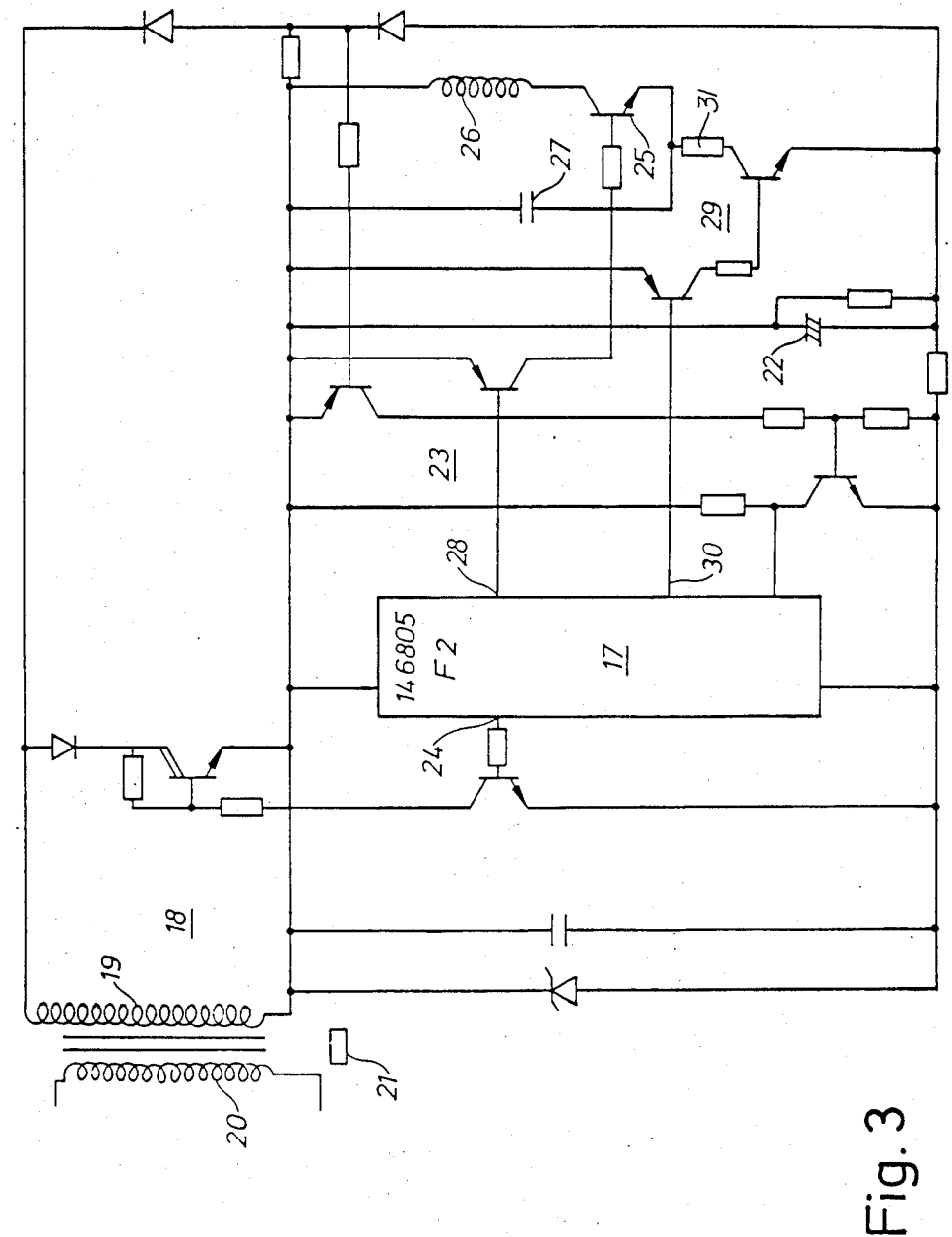

In FIG. 3 an ignition system is schematically shown provided with a releasing device built-in in a microprocessor 17 which is included in the electric system of the motor saw, mainly the ignition system. The processor has a built-in timer which measures the time of a revolution of the engine shaft by means of reference times on a voltage curve induced by an ignition generator 18. This generator has as usual a couple of windings 19, 20 and a magnet 21 positioned in a flywheel. The current supply to the electronic circuits is produced by rectification of the negative half-periods of the primary voltage from the winding 19, whereby a capacitor 22 is charged to an operating voltage. A transistor amplifier 23 is used to feed pulses at the reference time on the voltage curve which time occurs in this case 0.6 V before zero on the ascending part of the curve. The pulse is fed to the processor as a start signal of a procedure according to the following description.

The input to which a signal is supplied is scanned and the time is stored as a reference time. The storing is possible since the micro-processor has a timer running at a fixed frequency. At every reference time a number of time pulses occurring after the preceding reference time are registered. The number of pulses corresponds to a rotation of 360° of the crankshaft. By dividing the number of pulses between the reference times by a predetermined number, e.g. 16, a number remains which corresponds to an ignition advance of 360/16=22.5°. This number is called the reference number and is a memory data stored in a static memory of the processor. The reference number can be dependent on the r.p.m. and is at low r.p.m. inversely proportional thereto. When the number of time pulses reaches the said reference number the ignition is initiated via an output 24 on the processor. The timer is set to zero every time a reference time passes and the counting to the reference number takes place for every spark. At higher r.p.m. the reference number is so dependent on the r.p.m. that it gives one for the actual engine suitable ignition characteristica.

The special part of the device related to the release of the chain brake includes the transistor 25, an electromagnet coil 26 and a capacitor 27. The base of the transistor is connected to an output 28 of the processor which supplies a signal derived from a timer and memory circuits in the processor. The transistor closes the circuit so that a current will pass from the capacitor 27 through the coil 26. The electromagnet controls a latch arrangement of the chain brake which then permits tightening of the brake. The signal arises by measuring the time of revolution T by means of the timer which time from one revolution to the other is extended when a kick-back occurs. The condition for a brake release is that $$T_n - T_{n-n} > A$$

where $T_n$ is the time of the $n^{th}$ revolution, $T_{n-1}$ is the time of the foregoing revolution. A is a reference number which is proportional to the revolution, for instance $T_n/8$. To determine A for every type of motor saw is a practical job in which it is necessary to measure the time of revolution at the occasion of a kick-back and at a time point before such an occasion and to compute the time extension. The computation belongs to the ordinary use of a processor, and as an example it is given a standard number on the drawing on such a suitable processor.

The problem of charging the capacitor 27 is solved by a special charging circuit as shown in FIG. 3. The capacitor is supplied from the same source as other electronic components, namely the negative half-periods of the ignition generator, i.e. the surplus of energy remaining after that the electronic components are supplied. However, it is not possible to use the negative half-periods for charging already at the start, as the electronic components need all available energy during the start procedure. In the invention this problem is solved in that an r.p.m. responsive switch switches the charging circuit to the capacitor 27 first when the engine has reached a predetermined r.p.m., e.g. 3000 r.p.m. The switch can here be a transistor amplifier 29 connected to an output 30 of the processor, where the signal appears when the r.p.m. is about 3000, thereby charging the capacitor via a resistor 31. The signal arises in a register recording an r.p.m.-range>3000 r.p.m. The register is supplied with output code from the timer of the processor which during every revolution of the engine shaft counts up to a code which can be translated into r.p.m. of the engine. The register has the property of emitting the signal when it is supplied with a timer code corresponding to r.p.m.>3000.

The devices above described shall be considered examples of embodiments of the invention which can be varied with conventional techniques without departing from the inventive idea. For instance, negative and positive half-periods of the generated voltage can alternatively be used for the component supply and the spark, respectively. Moreover, the description is based on a system with magnetically induced ignition voltage but the invention is, of course, also applicable to capacitor discharge systems.

A further feature which increases the value of the invention is a circuit at the micro-processor which restricts the torque of the engine when the brake is applied. The torque is limited by the inhibition of the ignition during every second (or third, fourth etc) revolution. In the present embodiment the circuitry can be constituted of an AND-circuit and a bi-stable flip-flop which both are connected to the output 24 of the processor. The output of the flip-flop is connected to the other input of the AND-circuit and the output of it to the base of the following transistor (FIG. 3). However, the base has also a connection to the output 24 via a parallel branch including a switch which is usually closed and thus shunting the AND-circuit and the flip-flop. Upon the occurrence of a kick-back the switch will break the connection so that the AND-circuit and the flip-flop operate to cause a concellation of every second spark. This will decrease the torque and spare the centrifugal clutch and the crankshaft in the motor saw. The switch is reset to connection when the brake is put into the initial position again.

We claim:

1. In a motor saw having an engine for driving a saw chain, a brake for the saw chain, and an electrically controlled release apparatus connected to control the brake, the improvement wherein said brake release apparatus comprises means for providing a signal having a characteristic that changes as a function of the speed of rotation of said engine, and means responsive to a determined rate of change in said signal corresponding to a determined rate of decrease in the speed of rotation of said engine for applying a brake release signal to said brake, said determined rate of decrease of the speed of said engine corresponding to kickback of said engine.

2. The motor saw of claim 1 wherein said means providing a signal comprises means providing a first signal having a voltage corresponding to the speed of said engine, and means differentiating said first signal, and said means responsive to a determined change in said signal comprises a source of a reference voltage, and comparator means connected to produce said brake release signal when said differentiated signal exceeds said reference voltage.

3. The motor saw of claim 2 wherein said means providing a signal further comprises means producing a second signal having a frequency corresponding to the speed of rotation of said engine, and frequency to voltage conversion means for converting said second signal to said first signal.

4. The motor saw of claim 1 wherein said means producing a signal having a characteristic that varies as a function of the speed of rotation of said engine comprises means for producing a pulse at each rotation of said engine through a determined angle.

5. The motor saw of claim 4 wherein said means responsive to a determined change comprises electronic timing means responsive to said pulses for recording a first time of rotation of the engine through a given angle and for recording a second time of rotation of the engine through said given angle during another rotation thereof, means computing the difference between said first and second times, means storing a reference number, and means producing said brake release signal when said difference time exceeds said reference number, said reference number corresponding to kickback of said engine.

6. The motor saw of claim 5 wherein said electrically controlled release apparatus comprises a microprocessor.

7. The motor saw of claim 6 wherein said timing means comprises a timer in said microprocessor operating at a fixed frequency and a counter responsive to said time, and further comprising means resetting said counter for each revolution of said engine.

8. The motor saw of claim 6 wherein said engine comprises an ignition generator for producing said pulses and said microprocessor is connected to receive said pulses.

9. The motor saw of claim 1 wherein said brake includes an electromagnet, said means responsive to a determined rate of change of said signal further comprising an amplifier connected to apply said brake release signal to said electromagnet.

* * * * *